US012728890B2

(12) United States Patent
Takahashi et al.

(10) Patent No.: US 12,728,890 B2

(45) Date of Patent: Sep. 8, 2026

(54) CONTROL DEVICE

(71) Applicant: TOYOTA JIDOSHA KABUSHIKI KAISHA, Aichi-ken (JP)

(72) Inventors: Yuki Takahashi, Miyoshi (JP); Masateru Udate, Tokyo (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 146 days.

(21) Appl. No.: 18/733,856

(22) Filed: Jun. 5, 2024

(65) Prior Publication Data

US 2026/0042457 A1 Feb. 12, 2026

(30) Foreign Application Priority Data

Jun. 9, 2023 (JP) ................................ 2023-095777

(51) Int. Cl.
*B60W 50/08* (2020.01)
*B60W 60/00* (2020.01)

(52) U.S. Cl.
CPC .......... *B60W 60/001* (2020.02); *B60W 50/08* (2013.01)

(58) Field of Classification Search
CPC ........................... B60W 60/001; B60W 50/08
USPC ........................................................ 701/23
See application file for complete search history.

(56) References Cited

U.S. PATENT DOCUMENTS

2010/0235099 A1* 9/2010 Sakai ..................... G08G 1/166 701/301
2015/0251666 A1* 9/2015 Attard .................. B60W 50/14 701/23
2018/0107215 A1 4/2018 Djuric et al.
2019/0071100 A1 3/2019 Xavier
2021/0403038 A1 12/2021 Horigome et al.
2022/0404828 A1* 12/2022 Carroll ................ G05D 1/0077
2024/0253621 A1* 8/2024 Duan ............... B60W 60/0015

FOREIGN PATENT DOCUMENTS

CN 111532269 A * 8/2020
JP 2019-043495 A 3/2019
JP 2019-533810 A 11/2019
WO 2020/184290 A1 9/2020

* cited by examiner

*Primary Examiner* — B M M Hannan

(74) *Attorney, Agent, or Firm* — HAUPTMAN HAM, LLP

(57) ABSTRACT

The control device according to one aspect of the present disclosure selects one or more control models from a plurality of control models by a selection model and derives a control command of a mobile body by using one or more selected control models. In the absence of an intervention operation, the control device controls the operation of the mobile body according to the derived control commands. When there is an intervention operation, the control device discards the derived control command or overlaps the intervention operation with the derived control command and controls the operation of the mobile body according to the operation of the intervention by the user. The selection model is configured to select one or more control models to avoid the occurrence of intervention from the intervention archival record of the user.

3 Claims, 4 Drawing Sheets

CONTROL DEVICE

CROSS REFERENCE TO THE RELATED APPLICATION

This application claims the benefit of Japanese Patent Application No. 2023-095777, filed on Jun. 9, 2023, which is hereby incorporated by reference herein in its entirety.

BACKGROUND

Technical Field

The present disclosure relates to a control device.

Description of the Related Art

Patent Literature 1 proposes a system for autonomous vehicle control configured to determine vehicle commands from routes, GPS data, and sensor data using a trained neural network.

CITATION LIST

Patent Literature

Patent Literature 1: Japanese Patent Application Laid-Open No. 2019-533810

SUMMARY

One of the objects of the present disclosure is to provide an automatic control technique that can reduce the frequency of intervention by a user.

The control device according to the first aspect of the present disclosure comprises a storage that stores control models and a selection model, and a controller. Each of control models is configured to derive a control command to automatically control a movement of a mobile body. The controller is configured to perform selecting one or more control models from the control models by the selection model, deriving a control command of the mobile body using the selected one or more control models, when there is no intervention operation by a user, controlling an operation of the mobile body according to the derived control command, and when there is an intervention operation by the user, controlling the operation of the mobile body according to the intervention operation by the user with discarding the derived control command or overlapping the intervention operation with the derived control command. The selection model is then configured to select one or more control models so as to avoid an occurrence of intervention by the user from an intervention archival record of the user. For at least one of the control models and the selection model, a trained machine learning model may be used. A neural network may be used for the machine learning model.

According to the present disclosure, it can be expected that the frequency of intervention by the user will be reduced.

DESCRIPTION OF THE EMBODIMENTS

Figure 1:
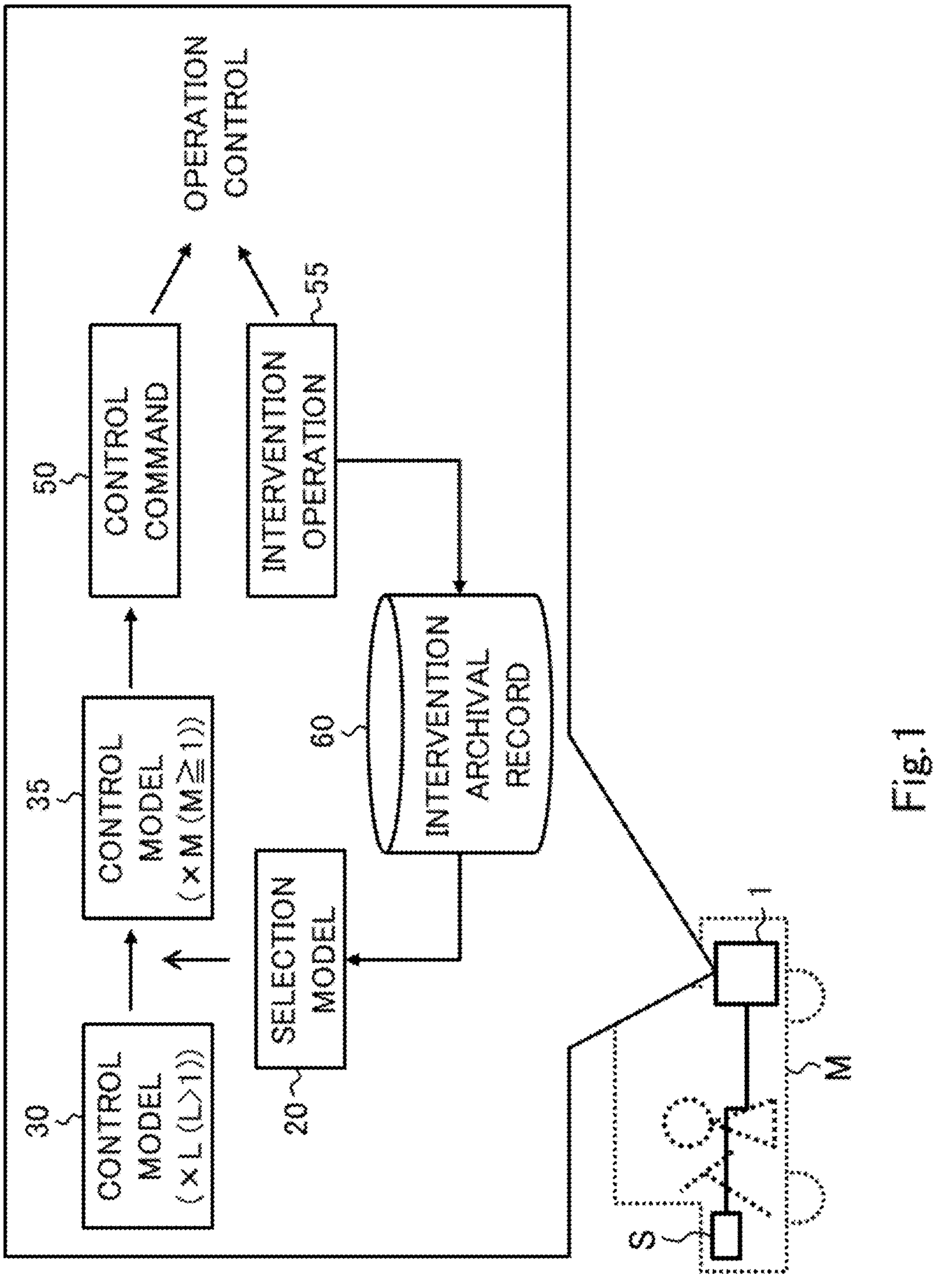
FIG. 1 schematically indicates an example of a situation in which the present disclosure is applied.

Conventionally, rule-based autonomous driving systems are known. Further, according to the method of Patent Literature 1 and the like, an autonomous driving system can be constructed by using a trained machine learning model. However, the control of autonomous driving by a control model (rule-based model or machine learning model) is not necessarily suitable for the user. If the control of automatic driving by the control model is not compatible with the user, an intervention operation by the user occurs, and manual operation is performed without automatic operation being performed. If the automatic driving by the control model is not widely adapted to the user, the autonomous driving system is rarely used, and there is a possibility that the intervention operation by the user will occur frequently. This problem point can occur regardless of the type of vehicle. Further, such problem can occur not limited to situations where the vehicle is controlled. In terms of controlling movement, the same applies to mobile bodies other than vehicles. Therefore, the same problem can occur in the scene of controlling any mobile body other than the vehicle.

On the other hand, the control device according to the first aspect of the present disclosure comprises a storage for storing a plurality of control models and a selection model, and a controller. Each control model is configured to derive a control command to automatically control a movement of a mobile body. The controller is configured to perform selecting one or more control models from the control models by the selection model, deriving a control command of the mobile body using the selected one or more control models, when there is no intervention operation by a user, controlling an operation of the mobile body according to the derived control command, and when there is an intervention operation by the user, controlling the operation of the mobile body according to the intervention operation by the user with discarding the derived control command or overlapping the intervention operation with the derived control command. The selection model is configured to select the one or more control models so as to avoid an occurrence of intervention by the user from an intervention archival record of the user.

In the first aspect of the present disclosure, the selection model is constructed to select the control model to avoid the occurrence of intervention by the user based on the intervention archival record that includes records of past intervention operations by the user. In a simple example, the selection model may be constructed to select another control model in a scene where an intervention has occurred in the past, rather than using the control model used in that scene at a new opportunity. In this way, the derived control command can be adapted to the user by adjusting the control model used for automatic control using the selection model constructed from the intervention archival record. Thereby, according to the present disclosure, it can be expected that the frequency of intervention by the user will be reduced.

As another form of the control device according to the above aspects, one aspect of the present disclosure is an information processing method, a program, or a machine-readable storage medium such as a computer that stores such a program, that realizes all or part of each of the above components. Here, a machine-readable storage medium is a medium that stores information such as a program by electrical, magnetic, optical, mechanical, or chemical action.

1 APPLICATION EXAMPLE

FIG. 1 schematically indicates an example of a scene in which the present disclosure is applied. The control device 1 according to the present embodiment is one or more computers configured to control the automatic movement of the target mobile body M. In the present embodiment, the control device 1 is mounted on the mobile body M and holds a selection model 20 and control models 30. Each control model 30 is configured to derive a control command to perform automatic control of the movement of the mobile body M.

In the present embodiment, the control device 1 selects one or more control models 35 from the plurality of control models 30 by the selection model 20, and uses the selected one or more control models 35 to derive a control command 50 of the mobile body M. If the derived control command 50 is appropriate, it is easy to accept automatic control by the control command 50, and it is unlikely that an intervention operation 55 by the user will occur, but if the derived control command 50 is not appropriate, it is assumed that the intervention operation 55 by the user is likely to occur. For example, if the speed of the mobile body M in the automatic control according to the control model 35 is suitable for the user, the possibility of acceleration or deceleration intervention is low, but if the speed of the mobile body M is slow or fast, it is assumed that the possibility of acceleration or deceleration intervention occurring is high.

In the absence of an intervention operation 55 by the user, the control device 1 controls the operation of the mobile body M according to the derived control command 50. On the other hand, when there is an intervention operation 55 by the user, the control device 1 controls the operation of the mobile body M according to the operation 55 of the intervention by the user with discarding the derived control command 50 or overlapping the intervention operation 55 with the derived control command 50. When the intervention operation 55 occurs, the control device 1 records information indicating the intervention as an intervention archival record 60. The more user intervention occurs, the more the intervention archival record 60 is accumulated. The selection model 20 is configured to select one or more control models 35 so as to avoid the occurrence of intervention by the user from the intervention archival record 60 of the user.

In a scene that is the same or similar to the scene in which the intervention occurred in the past, it is presumed that there is a high possibility that the intervention by the user will occur again if the same automatic control as the scene in which the intervention occurred is repeatedly performed. Therefore, in the present embodiment, the selection model 20 is constructed to select the control model 35 to avoid the occurrence of intervention by the user from the record of past intervention operations by the user (the intervention archival record 60). That is, in the present embodiment, the plurality of control models 30 is deployed, and the intervention archival record 60 is used to optimize the control model 35 used for automatic control (that is, selected by the selection model 20) from the trend of past interventions by the user. Thereby, among the plurality of control models 30, the control device 1 avoids using a control model that is presumed to be incompatible with the user in the target scene from the trend of past interventions, and actively uses a control model that is likely to be compatible with the user. As a result, according to the present embodiment, it can be expected that the frequency of intervention by the user will be reduced. In addition, by reducing the frequency of operation by the user, the wear of the operation tool of the mobile body M (for example, when the mobile body M is a vehicle, the steering wheel, accelerator pedal, brake pedal, etc.) can be suppressed, and the service life of the operation tool can be expected to increase.

(Mobile Body)

If it can be moved automatically by mechanical control, the type of mobile body M may be appropriately selected according to the embodiment. The mobile body M may be, for example, a movable device such as a vehicle, a flying body, a ship, a robot device, etc. The flying body may be at least one of an unmanned aircraft such as a drone and a manned aircraft. In one example, as shown in FIG. 1, the mobile body M may be a vehicle. In this case, it can be expected that the frequency of intervention by the user will be reduced when performing automatic driving of the vehicle. When the mobile body M is a vehicle, the type of vehicle (number of wheels, power source, size, etc.) may be arbitrarily selected. As an exemplary example, the mobile body M may be an automobile having a level 2 or higher autonomous driving capability.

(Controlling the Operation)

In one example, controlling the operation of the target mobile body M may be configured by directly controlling the target mobile body M. In another example, the mobile body M may include a dedicated control device such as a controller, for example. In this case, controlling the operation of the target mobile body M by the control device 1 may be configured by indirectly controlling the target mobile body M by giving a derivation result to the dedicated control device. Note that the control device 1 may be deployed at an arbitrary location. In one example, as shown in FIG. 1, the control device 1 may be mounted on the mobile body M. In another example, the control device 1 may be disposed away from the mobile body M and remotely control the mobile body M.

(Control Model)

Each control model 30 is constructed to derive a control command in response to an environment of the mobile body M. The environment is an event observed at least on the mobile body M itself and its surroundings. In one example, at least a portion of the environment may be observed by one or more sensors S disposed inside or outside the mobile body M. If the sensor S can observe any moving environment of the mobile body M, the type may not be particularly limited, and may be appropriately selected according to the embodiment. In one example, one or more sensors S may include a camera (image sensor), a radar, a LiDAR (Light Detection And Ranging), a sonar (ultrasonic sensor), an infrared sensor, a GNSS (Global Navigation Satellite System) 1 GPS (Global Positioning Satellite) module, and the like.

If the control command can be derived from the environment of the mobile body M, the input/output format of each control model 30 may be appropriately selected according to the embodiment. In one example, at least one of the control models 30 may be configured to derive control commands from observation data of one or more sensors at one or more time points. In another example, at least one control model may be configured to derive control commands from the recognition results of the surrounding environment. In this case, the control device 1 may further include an analysis model for inferring a recognition result of the surrounding environment from the observation data of the sensor. Alternatively, at least one control model may include the analysis model. The analysis model may be arbitrarily configured. In one example, the analysis model may be configured by a machine learning model. Other information may optionally be added to the input of at least one control model. The at least one control model may be further configured to accept input of arbitrary information such as, for example, speed set, speed limit, position, map information, navigation information, etc.

Each control model 30 may be composed of at least one of a trained machine learning model and a rule-based model. The rule-based model is configured to match a given input (for example, information indicating the environment such as observation data, recognition results of the surrounding environment) to a rule, and derive a control command according to the result of the matching (according to the matching rule). The rules may be set manually or at least partially automatically. The machine learning model is configured to have one or more operational parameters that can be adjusted by machine learning. One or more operational parameters are used to calculate the desired inference (in the present disclosure, derivation of control commands). Machine learning is the use of training data to adjust (optimize) the values of operational parameters. The machine learning model may be configured by, for example, a neural network, a support vector machine, a regression model, a decision tree model, and the like. The machine learning method may be appropriately selected according to the machine learning model to be adopted (for example, error backpropagation method, etc.).

As an example, at least one control model may be configured by a neural network. The structure of the neural network may be appropriately determined according to the embodiment, for example, the number of layers from the input layer to the output layer, the type of each layer, the number of nodes (neurons) included in each layer, the connection relationship between the nodes of each layer, and the like. In one example, the neural network may have a recursive structure. Further, the neural network may include, for example, an arbitrary layer such as a fully connected layer, a convolutional layer, a pooling layer, a deconvolutional layer, an unpooling layer, a normalization layer, a dropout layer, and an LSTM (Long short-term memory). The neural network may have an arbitrary mechanism such as an Attention mechanism. The neural network may include any model such as a GNN (Graph neural network), a diffusion model, a generative model (for example, a Generative Adversarial Network, a Transformer, etc.). When a neural network is used for a control model, the weight of the coupling between each node included in the control model and the threshold value of each node are examples of operational parameters. When the machine learning model is employed, the control model may be configured with an end-to-end model structure.

Among the plurality of control models 30, at least one control model is configured so that different control commands can be derived for other control models in the same environment or in the same mobile aspect. Thereby, when automatic control by any of the control models 30 does not suit the user (intervention occurs), another control model can be used to ensure the feasibility of automatic control adapted to the user. That is, the possibility of discovering the control model 35 that is compatible with the user can be secured by the selection of the selection model 20.

In one example, the structure of the trained machine learning model and the rule-based model may be different. Therefore, the characteristics of the automatic control of the trained machine learning model and the rule-based modeled may differ from each other. Thus, the plurality of control models 30 may include one or more trained machine learning models and one or more rule-based models. Thereby, variations in the characteristics of the automatic control can be ensured and the probability of the existence of a control model 30 that is suitable for the user can be increased. As a result, it is possible to expect a reduction in the frequency of intervention by the user.

In another example, the characteristics of the automatic control of the trained machine learning model may depend on the learning conditions. Therefore, the characteristics of machine learning models trained under different learning conditions (eg, different training samples used for machine learning, changing sampling probabilities, etc.) may be different. In addition, if the structure of the machine learning model is different, the inference results of the machine learning model may also be different. Thus, the plurality of control models 30 may include a plurality of trained machine learning models in which at least one of the learning conditions and structure are different from each other. Thereby, the same action effect as described above can be expected. When the plurality of control models 30 includes a plurality of rule-based models, the rules of each rule-based model may be different.

Also, the control required for each scene may vary. Therefore, each control model 30 may be prepared for each scene. In one example, when the mobile body M is a vehicle, the plurality of control models 30 may be prepared that differ for each scene such as lane change, lane keeping, emergency stop (EDSS: Emergency Driving Stop System), and the like. In this case, the plurality of control models 30 may be configured to include at least two or more control models that can be used for automatic control in at least one of the same or overlapping scenes of the target scene for which automatic control is performed. That is, the control device 1 may hold two or more control models for the same or overlapping scenes. As an example, when the mobile body vehicle M is a vehicle, the plurality of control models 30 may include a first control model and a second control model for the same lane change. At this time, the first control model and the second control model may be configured to derive different control commands so that the control contents such as lane change timing, speed, and steering angle are different from each other even in the same lane change scene.

(Control Command)

The control command (control command 50) relates to the operation of the mobile body M. The configuration of the control command may be appropriately selected according to the embodiment. In one example, the control command may consist of acceleration, deceleration, steering, or a combination thereof. Acceleration and deceleration may include gear changes. If at least one of acceleration, deceleration and steering is included, the control command may be expressed by a path. Correspondingly, each control model 30 may be described as a path planner. Further, the control command may further include a command related to the operation of the mobile body M. As an example, when the mobile body M is a vehicle, the control command may include vehicle operations such as blinkers, hazards, horns, communication processing (for example, transmitting data to a center, sending an emergency call, etc.).

In one example, each control model 30 may be configured to directly output control commands. In another example, each control model 30 is configured to indirectly output control commands, and control commands may be obtained by executing arbitrary information processing (interpretation processing) on the output of each control model 30. The control command may be configured to directly indicate the control amount (control instruction value, control output amount) of the mobile body M, such as the accelerator control amount, the brake control amount, and the steering wheel steering angle, for example. Alternatively, the control command may be configured to indirectly indicate the control amount of the mobile body M, such as a path, a state after control, and the like. In this case, by executing arbitrary information processing, the control amount of the mobile body M may be obtained from the control command.

(Select One or More Control Models)

Selecting one or more control models 35 may comprise selecting one control model 35 or selecting two or more control models 35. Accordingly, deriving the control command 50 of the mobile body M may comprise obtaining the control command 50 from one selected control model 35 or deriving the control command 50 by integrating control commands obtained from the two or more selected control models 35. Integrating may be performed by any operation such as sum, average, weighted average, etc. Thereby, the control command 50 can be appropriately obtained.

(Discard or Overlap)

Discard (ignore) may be an immediate switch from automatic control to manual control, i.e., from control by control command 50 derived from one or more control models 35 to control according to the operation 55 of the intervention by the user. On the other hand, the overlap may be a gradual switch from automatic control to manual control (user control).

(Selection Model)

The selection model 20 is configured to select the control model 35 that is inferred from the intervention archival record 60 that the probability of intervention occurrence is low or that the intervention will not occur. In one example, the selection rule of the selection model 20 is an environment that is the same as or close to the environment of the condition in which the intervention occurred in the past (i.e., the range of the environment in which the past intervention occurred), and the control model used at that time may be adjusted so as not to be used as it is. Whether or not the conditions are the same or in the vicinity may be inferred from environmental information such as observation data obtained by the sensor S.

In one example, the strategy for defining the selection rule may be to select one suitable control model by avoiding the control model in which the intervention occurred (e.g., randomly, specified in a predetermined order, etc.). Simply, the selection model 20 may be configured to select other control models other than the control model used at that time within the range of environments in which the intervention has occurred in the past. Preferably, the selection model 20 may be configured to select one control model capable of deriving a control command that is the same or in the vicinity of the control command of the intervention operation given by the user at that time.

In another example, the strategy for defining the selection rule may be to arbitrarily select two or more control models and derive an integration ratio of the two or more selected control models. The selection model 20 may be configured to select two or more control models within the range of environments in which interventions have occurred in the past. The two or more control models may be composed of the control model used at that time and one or more other control models, or two or more other control models other than the control model used at that time. The integration ratio of the two or more control models may be appropriately calculated to conform to the control command by user intervention at that time.

As long as the intervention archival record 60 can be reflected in the selection of the control model 35, the configuration of the selection model 20 may be appropriately determined according to the embodiment. In one example, the selection model 20 may consist of at least one of a rule-based model and a trained machine learning model. When the rule-based model is adopted, in the selection model 20, the information of the intervention archival record 60 may be reflected in the selection rule as it is. In one example, the selection model 20 may consist of information on the intervention archival record 60 and criteria for setting selection rules from the intervention archival record 60. The selection rules may be set manually or at least partially automatically. When employing a machine learning model, information of the environment in which the intervention occurred in the past indicated by the intervention history 60 is used as a training sample (input data), and the control model (and integration ratio) selected according to the selection rules is used as a label (teacher signal, correct answer data). Thereby, a trained machine learning model (selection model 20) reflecting the selection rules according to the above measures can be generated.

Note that the control models 30 may include a trained machine learning model and a rule-based model. Correspondingly, Accordingly, when the intervention archival record 60 includes a record (information) indicating that an intervention by the user occurred while performing automatic control of the mobile body M using the trained machine learning model, selecting one or more control models 35 may include selecting the rule-based model under a condition indicated by the record. The conditions indicated by the record may be in the same or vicinity as the environment in which the intervention occurred. The range of the vicinity may be arbitrarily defined. As a result, in an environment where the trained machine learning model is not suitable for the user, the control model to be used can be switched from a trained machine learning model to a rule-based model.

(Intervention Archival Record)

The intervention archival record 60 is composed of information on interventions by the user (records of interventions that have occurred in the past) that occurred while performing automatic control of the mobile body M using at least one of the control models 30 in the past. The data format of the intervention archival record 60 may be appropriately determined according to the embodiment. The intervention archival record 60 may be kept in any database format.

The items of information to be stored as the intervention archival record 60 may not be particularly limited if the selection model 20 can be formed and may be appropriately selected according to the embodiment. In one example, the intervention archival record 60 may include information (e.g., identifier, etc.) for identifying the conditions of the environment in which the intervention occurred (location, route, etc.) and the control model used in the environment of the conditions.

In addition to the information used to form the selection model 20, the intervention archival record 60 may further include information that can be used to improve the control model 30 (information for formulating rules or information for generating a data set used for machine learning). In one example, the intervention archival record 60 may further include an intervention operation by the user or a control command by the operation. When the control model 30 is composed of a machine learning model, machine learning for updating the control model 30 (re-learning, additional learning, etc.) may be performed with using the information indicating the conditions of the environment in which the intervention occurred included in the intervention archival record 60 as a training sample, and the operation of the intervention by the user or the control command by the operation as a label. The machine learning for updating may be performed on the control device 1 or may be executed on a computer other than the control device 1 (e.g., an external server).

Figure 2:
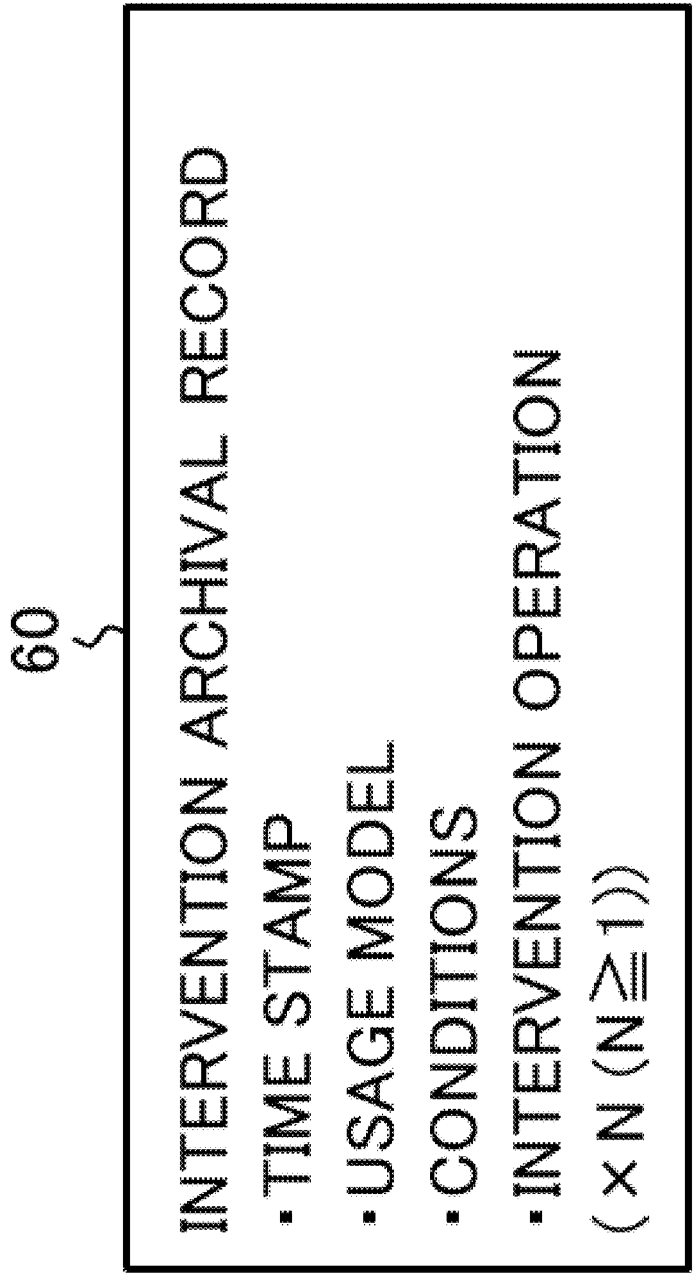
FIG. 2 schematically indicates an example of the data structure of the intervention archival record of the present disclosure.

FIG. 2 schematically indicates an example of the data structure of the intervention archival record 60 according to the present embodiment. In the example of FIG. 2, the record of the intervention archival record 60 includes a time stamp, identification information of the control model used (usage model), conditions of the environment in which the intervention occurred, and information indicating the operation of the intervention. The timestamp indicates the date and time when the intervention occurred. The date and time indicated by the timestamp may be used to delete old records, identify records to be reflected in the selection model 20 (when reflecting intervention archival records within a certain period of time in the selection model), and the like. Note that a record of the intervention archival record 60 may be generated for each intervention operation. The unit of intervention operation indicated by the record may be arbitrarily determined. In one example, one record (sample of intervention archival record) may be generated for each intervention operation. In another example, one record may be generated in response to multiple interventions.

(User)

The user may refer to a specific user or may refer to an unspecified user. In one example, while the target user is using the control device 1, the intervention archival record 60 of the target user alone may be reflected in the selection rule of the control model 35. In another example, the intervention history 60 of any user, including a user other than the target user, may be reflected in the selection rule of the control model 35. Note that when the mobile body M is a vehicle, the user is typically a driver.

2 CONFIGURATION EXAMPLE

Figure 3:
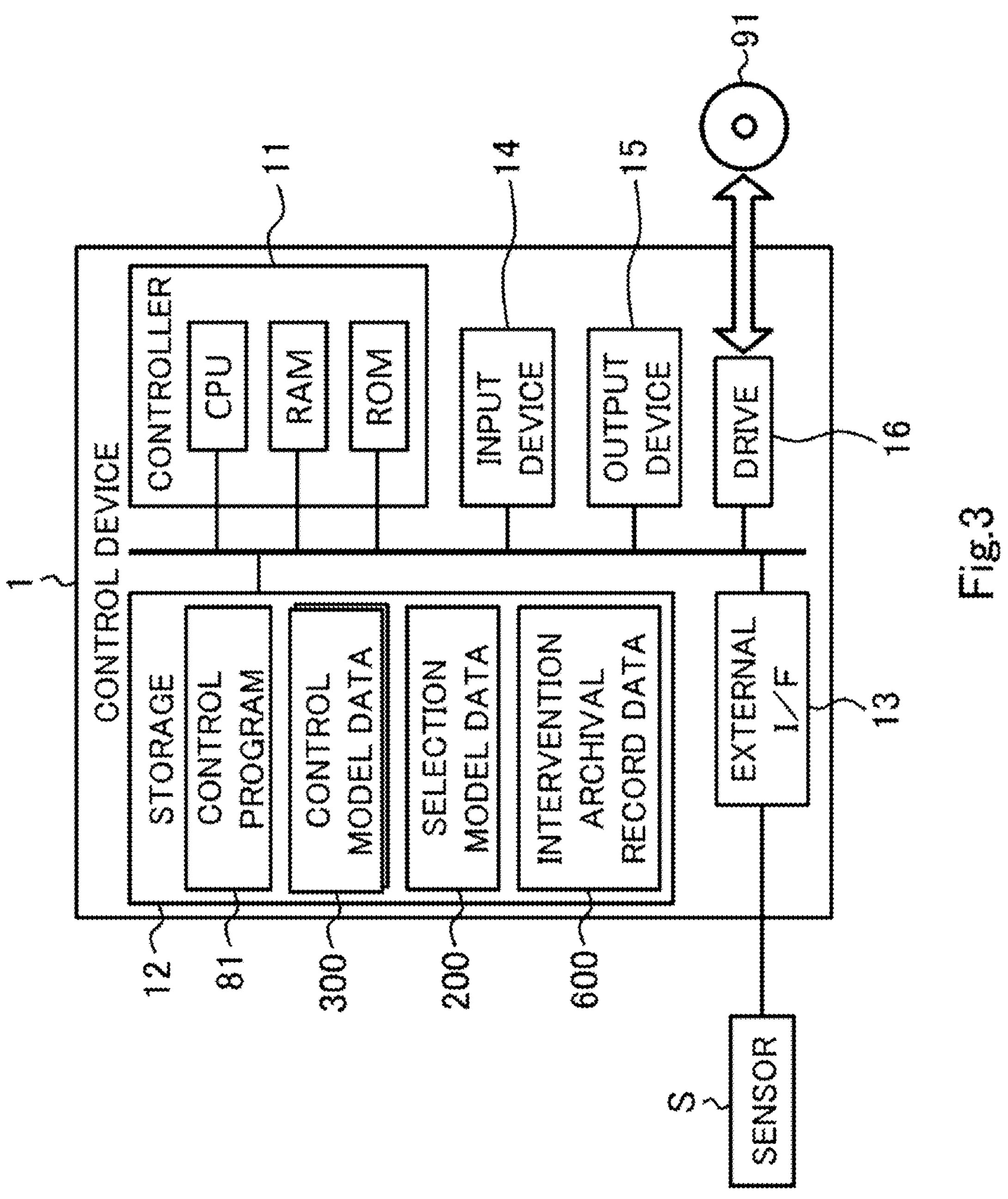
FIG. 3 schematically indicates an example of the hardware configuration of the control device of the present disclosure.

FIG. 3 schematically indicates an example of the hardware configuration of the control device 1 according to the present embodiment. The control device 1 according to the present embodiment is a computer in which the controller 11, the storage 12, the external interface 13, the input device 14, the output device 15, and the drive 16 are electrically connected.

The controller 11 includes a CPU (Central Processing Unit), RAM (Random Access Memory), ROM (Read Only Memory), and the like, and is configured to execute arbitrary information processing based on a program and various data. The controller 11 (CPU) is an example of a processor resource. The storage 12 may be configured of, for example, a hard disk drive, a solid-state drive, or the like. The storage 12 (and RAM, ROM) is an example of a memory resource. In the present embodiment, the storage 12 stores various information such as a control program 81, a control model data 300, a selection model data 200, and an intervention archival record data 600.

The control program 81 is a program for causing the control device 1 to execute information processing (FIG. 4 described later) for controlling the mobile body M. The control program 81 includes a series of instructions for the information processing. The control model data 300 is configured to indicate information about the control model 30. The selection model data 200 is configured to indicate information about the selection model 20. In one example, at least one of the control model data 300 and the selection model data 200 may include information indicating the value of an operational parameter adjusted by machine learning. At least one of the control model data 300 and the selection model data 200 may further include information indicating the configuration of the machine learning model (eg, the structure of a neural network, etc.). In another example, at least one of the control model data 300 and the selection model data 200 may include information indicating a rule-based model (rule). The intervention archival record data 600 may be appropriately configured to include information indicating the intervention archival record 60.

The external interface 13 may be, for example, a USB (Universal Serial Bus) port, a dedicated port, a wireless communication port, or the like, and is configured to connect to an external device by wire or wirelessly. In the present embodiment, the control device 1 may be connected to the sensor S via the external interface 13. The input device 14 is a device for performing input, for example, a mouse, a keyboard, or the like. The output device 15 is a device for performing output, for example, a display, a speaker, or the like. The input device 14 and the output device 15 may be integrally configured by, for example, a touch panel display or the like.

The drive 16 is a device for reading various information such as a program stored on the storage medium 91. At least one of the control program 81, the control model data 300, the selection model data 200, and the intervention history data 600 may be stored on the storage medium 91 instead of or together with the storage unit 12. The storage medium 91 is configured to store the information by electrical, magnetic, optical, mechanical or chemical action so that a machine such as a computer can read various information (such as a stored program). The control device 1 may acquire at least one of the control program 81, the control model data 300, the selection model data 200, and the intervention archival record data 600 from the storage medium 91. The storage medium 91 may be a disk-type storage medium such as a CD or DVD, or a storage medium other than a disk-type such as a semiconductor memory (for example, flash memory). The type of drive 16 may be appropriately selected according to the type of storage medium 91.

With regard to the specific hardware configuration of the control device 1, the component can be omitted, replaced, and added as appropriate according to the embodiment. For example, the controller 11 may include a plurality of hardware processors. The hardware processor may be composed of a microprocessor, an FPGA (field-programmable gate array), a DSP (digital signal processor), an ECU (Electronic Control Unit), a GPU (Graphics Processing Unit), and the like. At least one of the external interface 13, the input device 14, the output device 15, and the drive 16 may be omitted. The control device 1 may be a general-purpose computer, a terminal device, or the like in addition to a computer designed exclusively for the service provided.

3 OPERATION EXAMPLE

Figure 4:
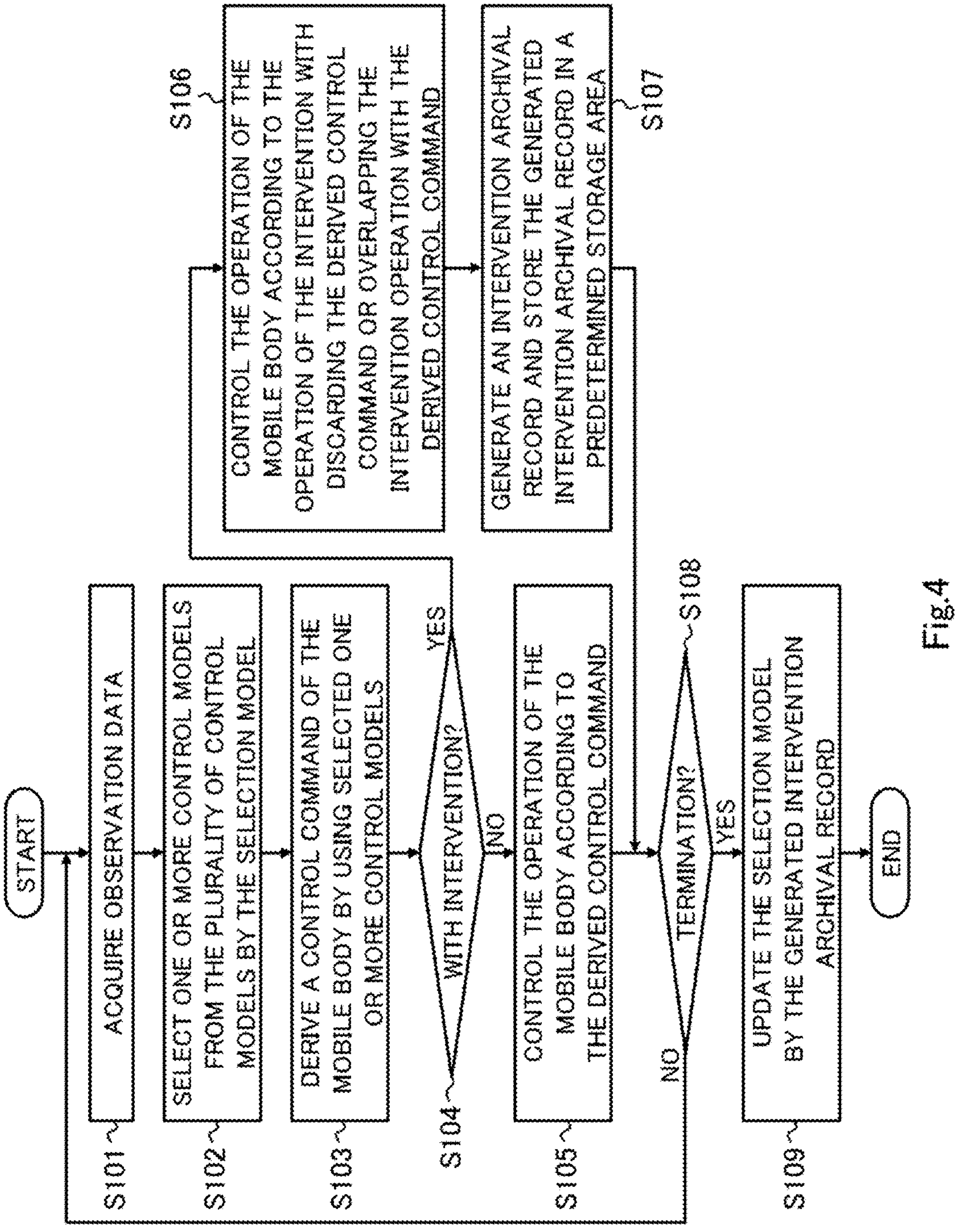
FIG. 4 indicates an example of a processing procedure related to control by the control device of the present disclosure.

FIG. 4 indicates an example of a processing procedure related to the control of the mobile body M by the control device 1 according to the present embodiment. The following processing procedure is an example of a control method executed by a computer. However, the following processing procedure is only an example, and each step may be modified as much as possible. Further, the following processing steps can be omitted, replaced, and added as appropriate according to the embodiment.

In step S101, the controller 11 operates as an acquisition unit and acquires observation data 125 of the sensor S. The controller 11 may directly or indirectly acquire observation data 125 from the sensor S. In step S102, the controller 11 operates as a selection unit and selects one or more control models 35 from the plurality of control models 30 by the selection model 20. In one example, when the selection model 20 includes a rule-based model, the controller 11 may derive the selection result of the control model 35 from the environment indicated by at least a part of the observation data 125 according to the rules. In another example, when the selection model 20 includes a trained machine learning model, the controller 11 inputs at least a part of the observation data 125 to the trained machine learning model and executes the arithmetic processing of the trained machine learning model. In step S103, the controller 11 operates as a derivation unit and derives a control command 50 of the mobile body M from at least a portion of the acquired observation data 125 by using selected one or more control models 35. Similar to the selection model 20, in one example, when the control model 35 includes a rule-based model, the controller 11 may derive the control command 50 according to the rules. In another example, when the control model 35 includes a trained machine learning model, the controller 11 may derive the control command 50 by executing the arithmetic processing of the trained machine learning model.

In step S102, the controller 11 may select one control model 35 or two or more control models 35. Accordingly, in step S103, the controller 11 may derive the control command 50 from the selected one control model 35. Alternatively, the controller 11 may derive the control command 50 by integrating the control commands obtained from the two or more selected control models 35. Further, the order of steps S102 and S103 may not be limited to such examples. In another example, step S103 may be executed prior to step S102. In this case, the controller 11 may derive control commands from all control models 30 that may be selected, regardless of whether or not they are selected. Then, the controller 11 may extract the control command of the control model 35 selected by step S102 among the derived control commands.

In step S104, the controller 11 operates as an intervention reception unit and determines whether or not the user has an intervention operation 55. The controller 11 may accept the intervention operation 55 by the user at any time while controlling the operation of the mobile body M. When the intervention operation 55 is accepted (that is, there is an intervention operation 55), the controller 11 proceeds to step S106. On the other hand, when the intervention operation 55 is not accepted (there is no intervention operation 55), the controller 11 proceeds to step S105.

In step S105, the controller 11 operates as an operation controller and controls the operation of the mobile body M according to the derived control command 50. When the operation control is completed, the controller 11 proceeds with the process to the next step S108.

In step S106, the controller 11 operates as an operation controller, discards the derived control command 50 or overlaps the intervention operation 55 with the derived control command 50, and controls the operation of the mobile body M according to the operation 55 of the intervention by the user. In step S107, the controller 11 operates as an archival record generator, generates information indicating the operation 55 of the intervention by the user, and stores the generated information in a predetermined storage area as the intervention archival record 60. A predetermined storage area (storage destination) may be arbitrarily selected. In one example, the predetermined storage area may be RAM, a storage 12, a storage medium 91, or the like. When the control device 1 is configured to be communicative, the predetermined storage area may be an external computer. Note that the processing timing of step S107 may not be limited to such an example, and may be appropriately changed. When the saving of the intervention archival record 60 (updating the intervention archival record data 600) is completed, the controller 11 proceeds to the next step S108.

In step S108, the controller 11 determines whether or not to terminate the control of the mobile body M. The criteria for judgment may be set arbitrarily. In one example, it may be determined that the controller 11 does not terminate control of the mobile body M while activating the mobile body M. On the other hand, the controller 11 may determine that the control of the mobile body M is terminated in response to an arbitrary termination instruction (for example, an operation of termination by the user via the input device 14). When it is determined that the control is not terminated, the controller 11 returns to step S101 and executes the process again from step S101. On the other hand, when it is determined that the control is terminated, the controller 11 proceeds with the process in step S109.

In step S109, the controller 11 operates as a model update unit and updates the selection model 20 with the generated intervention archival record 60. In one example, the controller 11 may update the selection model 20 according to the above strategy. Thereby, the selection model 20 is configured to select one or more control models 35 to avoid the occurrence of user intervention from the intervention archival record 60 of the user. In the example of FIG. 4, step S109 is executed each time the control is terminated, and the selection model 20 is updated. However, the processing timing of step S109 may not be limited to such examples and may be appropriately determined according to the embodiment. In another example, the controller 11 may update the selection model 20 by executing step S109 at regular intervals (for example, every other month, etc.). When the update of the selection model 20 is completed, the controller 11 ends the processing procedure of the control device 1 according to the present operation example.

Features

In the present embodiment, by the processing of steps S107 and S109 described above, the selection model 20 is constructed to select the control model 35 to avoid the occurrence of intervention by the user from the record of past intervention operations by the user. By using the selection model 20 in step S102, the control device 1 avoids using a control model that is presumed to be incompatible with the user in the target scene from the trend of past interventions among the plurality of control models 30. As a result, according to the present embodiment, it can be expected that the frequency of intervention by the user will be reduced.

4 MODIFICATIONS

As described above, embodiments of the present disclosure have been described in detail, but the description up to the above is only an example of the present disclosure in all respects. Needless to say, various improvements or modifications can be made without departing from the scope of the present disclosure. The processes and means described in the present disclosure can be freely combined and implemented as long as no technical contradictions arise.

What is claimed is:

1. A control device, comprising:
a storage that stores control models and a selection model, and
a controller,
wherein
each of the control models is configured to derive a control command to automatically control a movement of a mobile body,
wherein the controller is configured to perform:
selecting one or more control models from the control models by the selection model,
deriving a control command of the mobile body using the selected one or more control models,
when there is no intervention operation by a user, controlling an operation of the mobile body according to the derived control command, and
when there is an intervention operation by the user, controlling the operation of the mobile body according to the intervention operation by the user with discarding the derived control command or overlapping the intervention operation with the derived control command,
wherein the selection model is configured to select the one or more control models so as to avoid an occurrence of intervention by the user from an intervention archival record of the user,
the control models include a trained machine learning model and a rule-based model, and
when the intervention archival record includes a record indicating that intervention by the user occurred while performing automatic control of the mobile body using the trained machine learning model, the selecting one or more control models includes selecting the rule-based model under a condition indicated by the record.

2. The control device according to claim 1, wherein
the selecting one or more control models comprises selecting one control model or selecting two or more control models, and
the deriving the control command of the mobile body comprises obtaining the control command from the one control model or deriving the control command by integrating control commands obtained from the two or more control models.

3. The control device according to claim 1, wherein the mobile body is a vehicle.

* * * * *